UNITED STATES PATENT OFFICE.

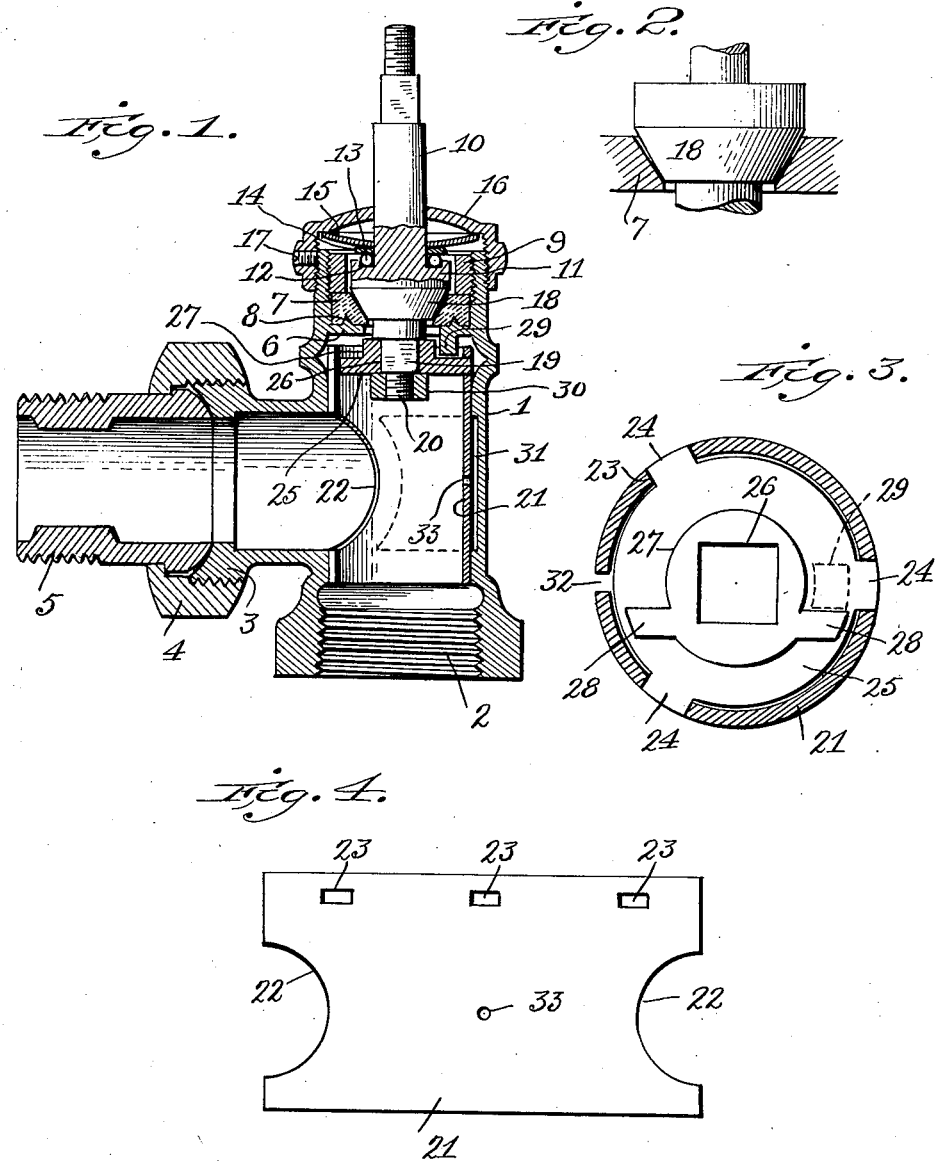

WILLIAM C. MARSH, OF DUNKIRK, NEW YORK.

VALVE.

1,111,598. Specification of Letters Patent. Patented Sept. 22, 1914.

Application filed September 9, 1913. Serial No. 789,012.

*To all whom it may concern:*

Be it known that I, WILLIAM C. MARSH, a citizen of the United States, residing at Dunkirk, in the county of Chautauqua and State of New York, have invented certain new and useful Improvements in Valves; and I do hereby declare the following to be a full, clear, and exact description of the invention, such as will enable others skilled in the art to which it appertains to make and use the same.

My invention relates to water valves for radiators, and of that type commonly known as packless, and has for its object to provide certain improvements in the construction of the same as will be hereinafter more definitely pointed out and claimed, reference being had to the accompanying drawing, in which:

Figure 1 is a central vertical sectional view of my improved valve. Fig. 2 is an enlarged and somewhat exaggerated view of the cone seat of the valve stem. Fig. 3 is an enlarged transverse sectional view of the valve, its cap being shown in elevation. Fig. 4 is a view of the struck up blank from which the valve is formed.

Similar numerals of reference denote corresponding parts in the several views.

In the said drawing the reference numeral 1 denotes the valve body or casing, having the usual interiorly threaded inlet aperture 2 and the exteriorly threaded discharge 3, to which may be connected, by a union nut 4, a short threaded pipe section or nipple 5, for connection with a radiator. The valve body or casing 1 is open at its upper end, and is screw threaded both interiorly and exteriorly, as shown, and has formed in its interior near its upper end a centrally apertured ledge or shelf 6, upon which rests a coned ring 7, preferably of some composition material, the upper face of said ledge or shelf having formed thereon an annular rib 8 adapted to bite into said coned ring 7 when the latter is forced into position, which is done by means of a threaded retaining nut 9 in engagement with the interior threads in the valve body or casing 1.

Disposed within the valve body or casing 1 is the lower end of the valve stem 10, suitably shaped at its upper end to receive an operating handle, and near its lower end enlarged at 11 forming a flat upper face that is provided with a run-way 12 to receive suitable ball bearings 13. Resting on said ball bearings is a disk 14 that in turn receives a disk spring 15, which is inverted and is held in place by a threaded nut or cap 16 engaging the exterior screw threads on the valve body or casing, and by which the tension of said spring 15 may be controlled, said cap or nut 16 being locked in any adjusted position by means of a locking screw 17. The enlargement 11 of the valve stem is cone shaped on its under surface at 18 to abut against the coned face of ring 7, and, as shown somewhat exaggerated and in detail in Fig. 2, said cone surfaces are of unequal pitch, whereby a sharp bearing will be provided between said surfaces at the lower edge of the coned surface 18. A portion of the valve stem 10 below the coned surface is squared at 19, and the reduced end 20 below the same is round and screw threaded.

The rotary valve 21 is formed from a sheet of non-corrosive metal initially stamped in the shape shown in Fig. 4, the same being then bent into cylinder form to bring into proximity the ends thereof, which are semi-circularly recessed at 22 to form the circular discharge therethrough. Said valve is also formed with a series of slots 23 near its upper edge to receive the lugs 24 formed on the valve cap 25, which latter is formed with a central squared opening 26 to receive the squared lower end 19 of the valve stem 10, and is thickened into a hub 27 around said opening 26, said hub having two oppositely disposed extensions 28, which are adapted to engage against a downwardly projecting stop 29 formed on the underside of the ledge or shelf 6, whereby but a half turn may be given the valve 21.

In assembling, the previously stamped valve is bent to substantially cylindrical form, and with its cap 25 mounted thereon with its lugs 24 engaged in the slots 23 in said valve, is inserted into the valve body 1 through the aperture 2 until the squared opening 26 in said cap engages the similarly squared lower end 19 of the valve stem 10, where it is fastened in position by means of a nut 30 screwed onto the threaded lower end 20 of the valve stem. The valve 21 being free to expand when released will form a perfect fit within the valve casing 1, the interior of the valve casing being machined to a true circle at top and bottom and around the lateral egress opening whereby a perfect fit of said valve is obtained. In order to reduce the friction of said valve the valve casing 1 is recessed at 31, to the contour shown in dotted lines in Fig. 1, and in order to provide for circulation when the valve is closed I provide a small aperture 33 in the center of said valve.

By my novel construction of coned surfaces for the valve stem 10 I provide most effectively against any leakage around said valve stem, while the novel construction of the valve 21 and its method of support from its cap 25 provides most effectively against excessive tension or frictional resistance in opening and closing said valve, the tendency during the rotary movement being to reduce the diameter of the valve, which it is free to do from the fact that its edges normally are slightly separated at 32, as seen in Fig. 3, and which causes it to act in a manner similar to that of a spring when being wound, and like a spring, to again expand when the rotary tension is relieved, so that it will form a perfect fit upon the machined interior surface of the valve casing 1.

Having thus described my invention, what I claim as new and desire to secure by Letters Patent is:

1. A valve, embodying a casing, a valve stem rotatable therein, and cone bearing surfaces on said valve stem and in said casing, said cone surfaces being of slightly different pitch to provide a sharp bearing between the two, and being in constant rotatable contact with each other.

2. A valve, embodying a casing, an apertured shelf or ledge within said casing, an annular rib on said shelf or ledge, a cone ring of composition material resting on said ledge or shelf, a retaining nut screwed into said casing to bear on said cone ring and force it into biting contact with said rib, and a valve stem having a cone surface engaging the cone surface of said ring.

In testimony whereof I have hereunto set my hand in the presence of two subscribing witnesses.

WILLIAM C. MARSH.

Witnesses:
N. F. GOULD,
T. J. CUMMINGS.